(12) United States Patent
Lee et al.

(10) Patent No.: US 9,253,752 B2
(45) Date of Patent: Feb. 2, 2016

(54) ASSET TRACKING SYSTEM ACTIVATED BY PREDETERMINED PATTERN OF ASSET MOVEMENT

(71) Applicant: Petari USA, Inc., Boston, MA (US)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US)

(73) Assignee: Senaya, Inc., Boston, MA (US)

( * ) Notice: Subject to any disclaimer, the term of this patent is extended or adjusted under 35 U.S.C. 154(b) by 310 days.

(21) Appl. No.: 13/845,802

(22) Filed: Mar. 18, 2013

(65) Prior Publication Data

US 2013/0324152 A1   Dec. 5, 2013

Related U.S. Application Data

(60) Provisional application No. 61/655,200, filed on Jun. 4, 2012, provisional application No. 61/706,379, filed on Sep. 27, 2012.

(51) Int. Cl.
| | |
|---|---|
| H04W 64/00 | (2009.01) |
| H04W 52/02 | (2009.01) |
| H04W 4/02 | (2009.01) |
| H04L 29/06 | (2006.01) |
| H04W 76/04 | (2009.01) |

(52) U.S. Cl.
CPC .............. *H04W 64/006* (2013.01); *H04L 69/28* (2013.01); *H04W 4/027* (2013.01); *H04W 52/0254* (2013.01); *H04W 76/048* (2013.01)

(58) Field of Classification Search
CPC .............. H04W 64/006; H04W 4/027; H04W 52/0225; H04W 52/0251; H04W 52/0254; H04W 52/0258; H04W 76/048; H04L 69/28; G06K 2017/0045; G06Q 10/0833; G07C 2009/0092; G08B 13/1436; G08B 21/0288; G08B 13/2417

USPC .................. 455/456.1–457, 343.1–343.5, 574
See application file for complete search history.

(56) References Cited

U.S. PATENT DOCUMENTS

| | | | |
|---|---|---|---|
| 5,438,607 A | 8/1995 | Przygoda, Jr. et al. | |
| 5,731,757 A * | 3/1998 | Layson, Jr. ................. | 340/573.1 |
| 5,844,482 A | 12/1998 | Guthrie et al. | |
| 6,373,389 B1 | 4/2002 | Przygoda, Jr. et al. | |
| 6,700,533 B1 | 3/2004 | Werb et al. | |
| 6,717,517 B2 | 4/2004 | Przygoda, Jr. | |
| 7,026,937 B2 | 4/2006 | Przygoda, Jr. | |
| 7,034,683 B2 | 4/2006 | Ghazarian | |
| 7,100,052 B2 | 8/2006 | Ghazarian | |

(Continued)

*Primary Examiner* — Vladimir Magloire
*Assistant Examiner* — Erica Navar
(74) *Attorney, Agent, or Firm* — HolzerIPLaw, PC

(57) ABSTRACT

An asset tracking system that optimizes the value per ping by tying the ping to a pattern of movements of the asset. The asset tracking device will send a ping to a remote host (i.e., receiver) when pre-determined condition(s) regarding the movement are met, conditions such as the pattern of movement, and number of movements within a time period. In such a manner, the value per ping is optimized, leading to increased battery life and decreased operational cost. To satisfy these conditions, the asset tracking device is equipped with appropriate sensors, actuators, and trigger mechanism(s). The sensors and actuators detect movements and/or confirm or recognize a sequence of movements. When the detected movements and/or sequence of movements match a predetermined, recognized pattern or condition, the trigger mechanism is activated, after which a data ping is sent.

16 Claims, 8 Drawing Sheets

(56) References Cited

U.S. PATENT DOCUMENTS

| | | |
|---|---|---|
| 7,133,704 B2 | 11/2006 | Twitchell, Jr. |
| 7,155,264 B2 | 12/2006 | Twitchell, Jr. |
| 7,173,529 B2 | 2/2007 | Przygoda, Jr. |
| 7,209,771 B2 | 4/2007 | Twitchell, Jr. |
| 7,252,230 B1 | 8/2007 | Sheikh et al. |
| 7,336,182 B1 | 2/2008 | Baranowski et al. |
| 7,443,297 B1 | 10/2008 | Baranowski et al. |
| 7,446,658 B2 | 11/2008 | Panotopoulos |
| 7,564,357 B2 | 7/2009 | Baranowski et al. |
| 7,956,746 B2 | 6/2011 | Truscott et al. |
| 8,095,070 B2 | 1/2012 | Twitchell, Jr. |
| RE43,178 E | 2/2012 | Ghazarian |
| 8,204,439 B2 | 6/2012 | Twitchell, Jr. |
| 8,248,242 B2 | 8/2012 | Caliri et al. |
| 2007/0091292 A1* | 4/2007 | Cho et al. .................. 355/75 |
| 2007/0296571 A1* | 12/2007 | Kolen ..................... 340/539.11 |
| 2010/0149030 A1* | 6/2010 | Verma et al. ............. 342/357.09 |
| 2012/0068921 A1* | 3/2012 | Jacobsen et al. ............. 345/156 |

* cited by examiner

ASSET TRACKING SYSTEM ACTIVATED BY PREDETERMINED PATTERN OF ASSET MOVEMENT

CROSS-REFERENCE TO RELATED APPLICATIONS

This application claims the benefit of U.S. Provisional Application No. 61/655,200 filed Jun. 4, 2012 and U.S. Provisional Application No. 61/706,379 filed Sep. 27, 2012, the entire contents of which are incorporated herein by reference for all purposes.

FIELD OF THE DISCLOSURE

The present disclosure relates generally to asset tracking devices and systems. Based on the movement and relation of the assets or items in the environment, the system of the disclosure locates the assets in the environment through the use of wireless communication tracking devices.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries.

Recently, technologies have been developed that greatly assist in tracking locations of assets. For example, global positioning systems (GPS) use wireless signals transmitted by earth-orbiting satellites to calculate the position of a receiving device. Although relatively expensive, GPS receivers are capable of providing relatively accurate location information for virtually any point in the world.

More recently, radio frequency identification (RF or RFID) systems have been developed in which devices, often referred to as "tags," wirelessly communicate with readers. RF tracking systems are typically used in parcel tracking and sorting, container tracking, luggage tracking, retail tracking, warehouse tracking and inventory operations. The RF tags may be either passive or active. Passive tags absorb signals transmitted by the reader and retransmit their own signals, such as identification information. While passive tags do not require a local power source, their resulting transmit range is relatively short, typically less than 5-10 meters. In contrast, active tags, which send a signal to indicate its location, include a local energy source (such as a battery) that improves transmission range. Depending on the wireless signal system used by the device, the range may be on the order of several meters or several hundred meters. Regardless of the types of tags used, knowledge of the fixed location of the reader devices allows users to identify the location of assets that have tags attached thereto.

Active tag systems are preferred for some applications due to their long range transmission range. Unfortunately, the position signal or "ping" drains battery life of the transmitter, thus resulting in added operational cost of the system.

Obtaining increased system value and decreased operational cost are key business and technical goals for designers of tracking systems. Increasing the value per ping, by decreasing the cost per ping, is one mechanism to decrease the operational cost of active systems. In an exception based asset management environment, the value per ping is the lowest under normal conditions. Merely increasing the period between subsequent pings, however, although it may decrease the cost per ping, does not intelligently decrease the cost per ping, as the extended period may miss critical movement of the tagged asset.

SUMMARY

The value per ping is highest when the ping captures a business critical event in the field. The present disclosure provides an active RF tracking system in which the value per ping is increased (preferably optimized) by adjusting the ping rate under different conditions. In this disclosure, the ping rate, ping occurrence, and ping period is based on detected pre-selected motion of the tagged asset.

The present disclosure provides a method and apparatus for optimizing value per ping for an asset tracking device by tying the ping occurrence to a predetermined movement of the asset. The asset tracking device will send a ping to a remote host (i.e., receiver or cellular communication tower) when pre-determined condition(s) regarding the movement are met, conditions such as time between movements, the pattern of movement, and number of movements within a time period. In such a manner, the value per ping is optimized, leading to increased battery life and decreased operational cost. To satisfy these conditions and exception events, the asset tracking device is equipped with appropriate sensors, actuators, and trigger mechanism(s). The sensors and actuators detect movements and confirm or recognize a sequence of movements. When the detected movements and sequence of movements match a predetermined, recognized pattern or condition, the trigger mechanism is activated, after which a data ping is sent.

In one particular embodiment, this disclosure provides an RF wireless tracking system that includes a transmitter comprising a power source, a GPS positioning element, a motion sensor, a two-way wireless RF communication module, a timer and control circuitry; and a receiver. The transmitter is configured to send data regarding the location of the transmitter to the receiver, and the receiver configured to receive the data from the transmitter. The transmitter has a first sleep state, an idle state, a pattern recognition state, a ping state, and a transit state. The system includes appropriate circuitry, programming, algorithms, etc. to allow the transmitter to switch among the various states based on movement (and non-movement) of the transmitter.

In another particular embodiment, this disclosure provides a method of tracking an asset with a wireless RF system comprising a transmitter and a receiver. The method includes beginning the tracking with the transmitter in a sleep state and monitoring for movement from the sleep state. If movement is detected, the transmitter switches to a pattern recognition state. If no pattern of movements is recognized, the transmitter returns to the sleep state but if a pattern of movements is recognized, the transmitter switches to an idle state. From the idle state, the transmitter switches to a ping state if a time period T2 has expired, and sends a data ping from the transmitter to the receiver. After sending the data ping, the transmitter returns to the idle state. In some embodiments, when monitoring for movement from the sleep state, if a sequence of at least N1 movements is detected within a third time period T3, the transmitter switches to a transit state and then to a second sleep state. Further, in some embodiments, the transmitter continues by monitoring for movement from the second sleep state and checking a timer. If movement is detected, the device will remain in the sleep state, but if no movement is detected within a fourth time period T4, the transmitter switches to the ping state, sending data regarding the location of the transmitter, and then switching to the idle state.

Disadvantages of prior wireless data fetching systems (e.g., tracking systems) include having non-value added pings, which thus cause faster battery drainage, and having timed or scheduled pings unrelated to practical events (e.g., business logic or exception events), which thus reduce the value per ping. The system of the present disclosure increases value per ping, provides a longer battery life for the battery-powered tracking device, and decreases operational cost, particularly battery maintenance cost.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
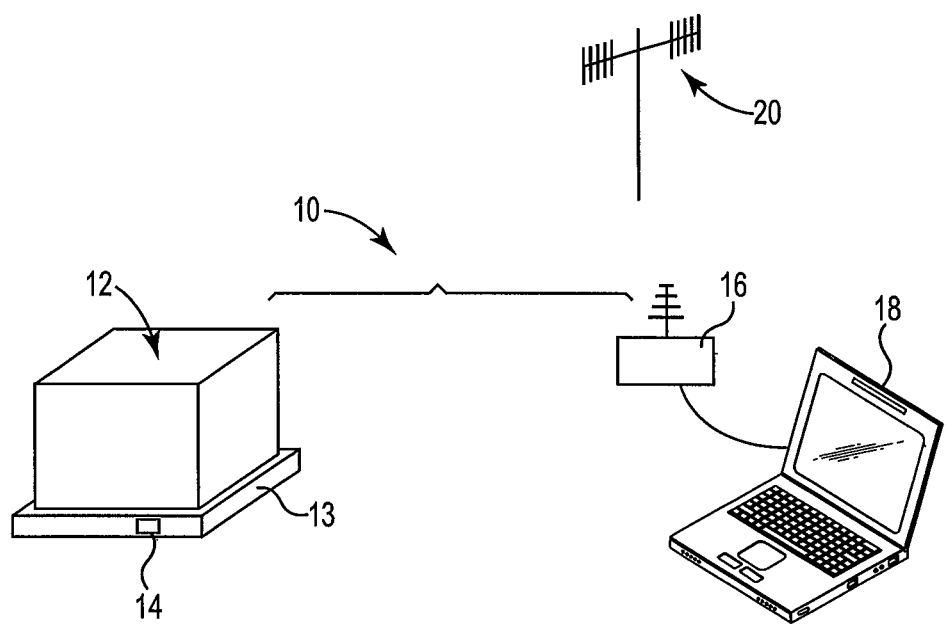
FIG. 1 is a perspective view of components of a tracking system according to this disclosure.

Assets and products (e.g., items, objects or people) move through different paths, such as manufacturing processes and supply chains during the course of their lifetime. There is a desire to track these assets, in some embodiments, because of their value or, in other embodiments, for business justification purposes. A tracking device or system therefore is highly beneficial for solving the dilemma of knowing the physical location of the asset at a set point in time.

The present disclosure is directed to a wireless, active, RF tracking system that increases value per ping, provides a longer battery life of the battery-powered device, and decreases operational cost, particularly battery maintenance cost. Disadvantages of prior wireless data fetching systems include having non-value added pings (thus causing faster battery drainage), and having timed or scheduled pings unrelated to business logic or exception events, thus reducing the value per ping.

The present disclosure provides an asset tracking device and method using an optimized communication protocol. The asset tracking device will send a data ping, identifying the tracking device's location, to a remote host (receiver) when predetermined "motion signatures" are met. A "motion signature' is a set or sequence of movements, that when combined, qualify as a unique business event, such as loading of the asset onto a transportation vessel, unloading, etc. Here, the ping occurrence is coupled to a recognized pattern of motion, such as the loading or unloading event. Any other recognized pattern of motion (such as one unrelated to the business event) or any unrecognized motion that does not match a motion signature will not trigger the ping. With such a protocol, the value per ping is increased and preferably maximized. This leads to optimal usage of battery life and decreased operational cost.

The tracking system includes a transmitter device configured for attachment to the item to be tracked and a receiver device. In addition to the various components for sending its position data to the receiver, the transmitter includes a motion sensor for detecting movement of the device. Although the term "motion sensor" is used herein, it is to be understood that multiple sensors may be used to detect and/or recognize the motion. The tracking system also includes a motion recognition algorithm and trigger mechanism. The motion recognition algorithm automatically processes, analyzes and recognizes the detected motions, and searches for similarity to a predetermined, recognized pattern of motion. When the motions match the recognized pattern, the trigger mechanism is activated.

In some embodiments, the tracking system also includes a wireless, RF communication module for transmitting and receiving signals; a timer configured to provide initiate various active state or idle state functions to the transmitter device; a power source configured to provide power to the device; and appropriate control logic.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The tracking devices and systems of this disclosure utilize an intelligent, active ping to increase the value per ping from the transmitter and provide a longer battery life for the battery-powered transmitter. The system utilizes a motion-based ping in which the ping occurrence is adjusted based on predetermined events, specifically, the expected occurrence of an event (a business event) and/or physical movement or motion of the device. In some embodiments, the system combines the motion-based ping with a time-based pin. The system has lower operational cost, particularly battery maintenance cost, than conventional active ping systems that have a set ping rate or a random ping rate.

FIG. 1 illustrates a system 10 of the present disclosure. System 10 includes an asset 12 on which is located a transmitter device 14. Transmitter device 14 is an active RF tag, having the capability to actively transmit and/or provide interactive information to a receiver 16, located remote from asset 12 and transmitter device 14. Receiver 16 is operably connected to a computer or display 18. System 10 uses an established wireless communication network 20 to identify the location of transmitter device 14 and convey that information to display 18. Examples of wireless RF communication networks 20 with which system 10 can function include CDMA/GMS, ZigBee, (Low Energy) BlueTooth (LBT), WiFi (sometimes referred to as WLAN), LTE, and WiMax.

Transmitter device 14 is secured to asset 12, for example, on pallet 13 on which is loaded goods; in some embodiments, device 14 may be secured to pallet 13 in a manner that does not readily allow removal of device 14 from pallet 13. In some embodiments, transmitter device 14 is embedded into pallet 13, for example, in the center of pallet 13 under its top surface, whereas in other embodiments transmitter device 14 is adhered to pallet 13. Alternately, transmitter device 14 is removably secured to asset 12, for example, on the goods present on pallet 13. In such embodiments, device 14 is preferably on the top surface or on a surface close to the highest point of asset 12. Device 14 is preferably positioned on asset 12 so that no operators, animals, equipment, etc. can access transmitter device 14 during normal movement of asset 12 and remove, damage or otherwise hinder the operation of device 14. Preferably, transmitter device 14 is independently powered and electrically isolated from asset 12 and does not require manual intervention during normal operation of the tracking system 10.

Figure 2A:
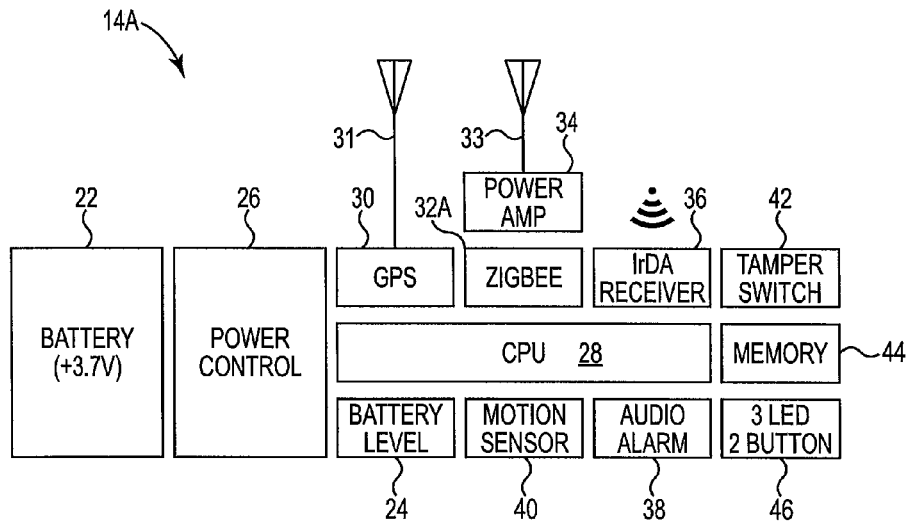
FIG. 2A is a schematic block diagram of a tracking device according to this disclosure.
Figure 2B:
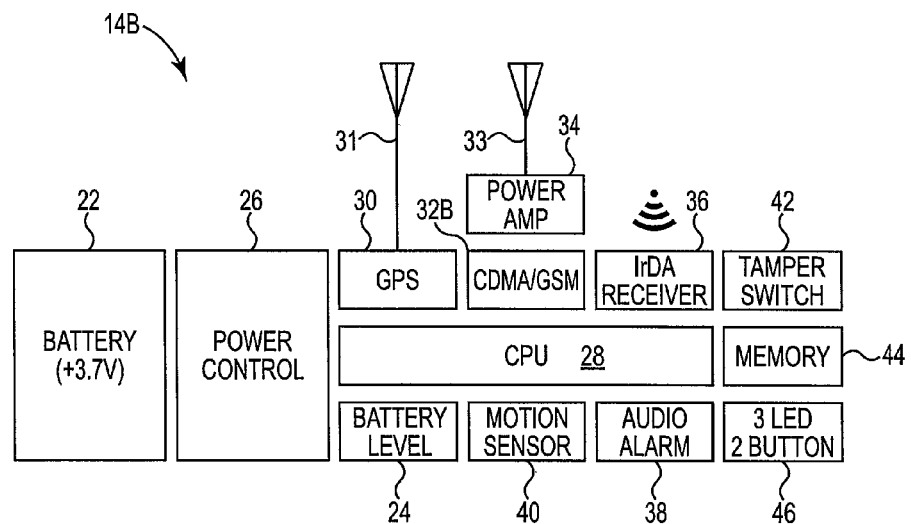
FIG. 2B is a schematic block diagram of an alternate tracking device according to this disclosure.

FIGS. 2A and 2B illustrate two embodiments of transmitter device 14, as transmitter device 14A and 14B respectively. Each embodiment includes a battery 22, which may be a single use battery or a rechargeable battery. Examples of suitable batteries include NiCad, lithium, lithium-ion, zinc-carbon, and alkaline batteries. In the figures, batteries 22 are identified as a 3.7V battery, although it is understood that other voltage batteries 22 could be used. Electrically connected to battery 22 is a battery level monitor 24 and a power control 26, which in turn is operably connected to a computer chip or CPU 28. Transmitter device 14 also includes a positioning element, in these embodiments a GPS positioning element 30 connected to an antenna 31, which may be an internal antenna or an external antenna. Positioning element 30 provides data to transmitter device 14A, 14B regarding its physical location. When device 14A, 14B transmits data (i.e., pings), this location can then be transmitted to display 18.

In some embodiments, transmitter device 14 has two-way communication with receiver 16. That is, transmitter device 14 transmits information and also receives information from receiver 16. Transmitter device 14 transmits information, such as location, to display 18. Further, transmitter device 14 receives instructions, such as to acknowledge that device 14 is active and ready and to transmit the location information. Having received those instructions, device 14 can send back to receiver 16 acknowledgement that the communication was received and acted on.

The two embodiments of FIGS. 2A and 2B differ only in that device 14A of FIG. 2A includes a ZigBee module 32A, configured to connect to receiver 16 via a ZigBee network 20 and communicate data to display 18, whereas device 14B of FIG. 2B includes a CDMA (Code Divisional Multiple Access) and/or GSM (Global System for Mobile Communication) module 32B, configured to connect to receiver 16 via either a CDMA or GSM network 20 and communicate data to display 18. Modules 32A, 32B each have an antenna 33, which may optionally include a power amplifier 34 to extend the range of the signal from module 32A, 32B. It is these modules 32A, 32B that provide the communication basis for transmitter device 14 to display 18. An alternate embodiment of a transmitter device can include both a ZigBee module 32A and a CDMA and/or GSM module 32B. In any of the embodiments, the ZigBee module and network may be a combined ZigBee/LBT module and its corresponding network.

Additionally, transmitter devices 14A, 14B may include a data receiver 36, such as an infra red data link (IrDA), to provide a second communication means to device 14A, 14B, as an alternate or back-up to module 32A, 32B. IrDA 36 includes an optical window formed from an IR transparent material, such as glass, to allow infra red radiation or energy to pass to and from IrDA 36. An audio alarm 38 may be included, to indicate any number of problems or malfunctions, such as low battery level, unauthorized movement (as sensed by motion sensor 40), or tampering with device 14A, 14B (as sensed by switch 42).

Any of the data or information regarding devices 14A, 14B, such as its position as determined by positioning element 30, alarm information, battery level information, and ping information, etc., can be stored in memory 44 of device 14A, 14B, which may be a permanent memory or a rewritable memory. Devices 14A, 14B also include various operational switches and buttons 46, in these embodiments, 3 LED lights and 2 button. The various elements that compose transmitter device 14A, 14B may be housed in an RF transmissive case, preferably one which is at least water resistant.

Figure 3A:
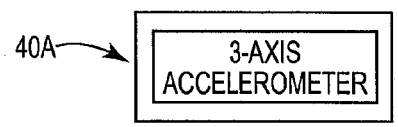
FIGS. 3A, 3B, 3C and 3D are schematic block diagrams of alternate motion sensors.
Figure 3B:
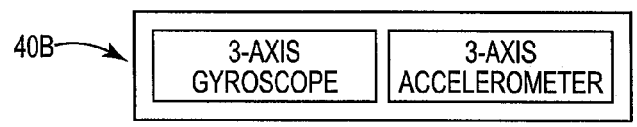
Figure 3C:
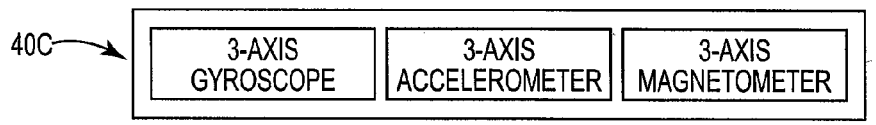
Figure 3D:
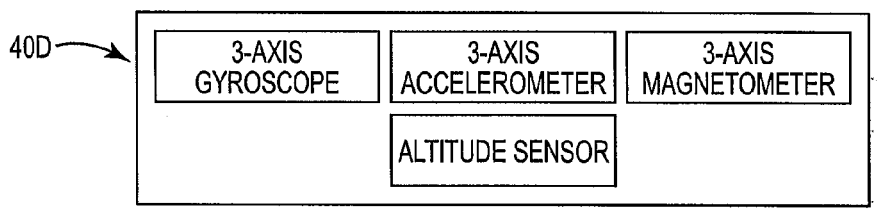

FIGS. 3A through 3D illustrate four embodiments of motion sensor 40. In FIG. 3A, motion sensor 40A is a three degree of freedom (DOF) device that has a 3-axis accelerometer. In FIG. 3B, motion sensor 40B is a six degree of freedom (DOF) device that includes a 3-axis gyroscope and a 3-axis accelerometer. In FIG. 3C, motion sensor 40C is a 9-DOF device that includes a 3-axis gyroscope, a 3-axis accelerometer and a 3-axis magnetometer. In FIG. 3D, motion sensor 40D includes a 3-axis gyroscope, 3-axis accelerometer, 3-axis magnetometer, and also an altitude sensor; this may be referred to as a 10-DOF device. Other embodiments of motion sensor 40 may be used.

Motion sensor 40 (including any of motions sensors 40A, 40B, 40C, 40D) detects physical movement of device 14, and in some embodiments, recognizes a predetermined sequence of movements. The acts of loading and unloading of the tracked asset are commonly identified as business events. A loading event can be defined as, for example, the sequence of the following movements: a vertical movement up, a lateral movement, a turn movement, a lateral movement, and a vertical movement down. An unloading event can be defined as the sequence of the following movements: horizontal movement, a turn movement, a vertical movement up, another turn movement, a lateral movement, and a vertical movement down. Many times, these sequences of movements are unique and distinguishable from other movements. It is understood that depending on the particular location, transport equipment and logistics, that a different sequence of movements may represent an unloading or a loading event. For example, space constraints may dictate additional lateral or turning movements. Transmitter device 14 (e.g., transmitter device 14A, 14B) can be programmed to recognize any predetermined movement sequence as a business event.

The effectiveness of tracking system 10 to track and/or locate asset 12 is directly impacted by the life of the power source (i.e., battery 22) that provides transmitter device 14 (e.g., transmitter device 14A, 14B) with the energy to perform its function, which includes sending its 'ping'. The expectation with these tracking systems 10, and particularly transmitter device 14, is to have autonomous operation for extended periods of time, such as days, weeks, and sometimes even months. An active RF tag or transmitter device 14 actively transmits its location or other data at a predetermined point in time to receiver 16. Although each data transmission or ping from transmitter device 14 uses very little power from the self-contained battery, over extended periods of time, such as days, weeks, and sometimes even months, the battery is drained of power, resulting in a poorly functioning or non-functioning transmitter which could result in a lost tagged asset. To reduce the opportunity of a poorly functioning or non-functioning transmitter, the transmitter undergoes battery maintenance or replacement, which increases operational expenses.

To extend the life of the power source (i.e., battery 22), the active RF tracking system 10 of the present disclosure increases the value per ping by basing the ping rate and ping occurrence on probability of a desired business event and/or motion of the tagged asset. During periods of inactivity (i.e., no probability of a desired event and no motion of the asset), the transmitter device is in a power-saving sleep state or power-saving idle state. At some states, even motion sensor 40 deactivates.

Motion sensor 40 (including any of motions sensors 40A, 40B, 40C, 40D) is configured to be active when there is a predetermined probably of movement of the tagged asset and/or probability of a desired event. That is, motion sensor 40 is not in an 'on' or motion detection stage at all times, but only at times when there is a predetermined possibility that motion will occur. Motion of the asset generally occurs due to an event of interest, such as a business event of moving the asset (for example, from a manufacturing or packaging area to a warehouse area), loading of the asset (for example, into a truck), or unloading of the asset (for example, from a truck); thus, motion sensor 40 is active when there is a probability such an event will occur. Motion sensor 40 may additionally be active when there is a known probability that another event of interest will occur, such as a predicted or possible loss of RF signal (for example, in a location known to have poor or no RF signal transmission, such as within a tunnel or other RF shielded area), a sudden change of temperature (either increase or decrease), sudden change in motion (acceleration, deceleration, or stop), and the like.

For periods of time when the location of the tracked asset is known, if even in motion, tracking device 14 and motion sensor 40 are "off", conserving power. For example, after loading an asset onto a truck, motion sensor 40 will deactivate, because although the truck with the asset is moving (for example, down a highway), it is known that the asset will remain on the truck, and thus it is not necessary to track the asset until it is unloaded from the truck. As another example, when pallets are moved into a pallet service center, such as for a repair, tracking device 14 and optionally motion sensor 40 are "off", conserving power. Typically, after an empty pallet is loaded onto a conveyer belt, motion sensor 40 will deactivate, because although the pallet is moving, it is known that the pallet will remain at the service center, and thus it is not necessary to track the pallet until it is loaded on to the truck. If motion or movement has occurred continuously for a predetermined period of time, or if a predetermined number of movements have occurred within a predetermined time period, transmitter device 14 will switch to a power-saving transit mode, deactivating both motion sensor 40 and the data transmission or communication module.

Figure 4:
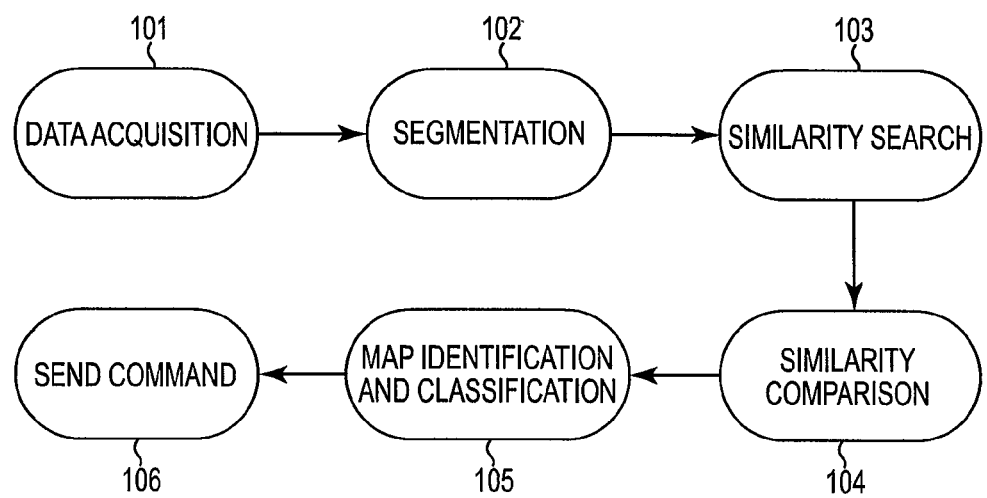
FIG. 4 is a schematic block diagram showing a sequence of actions by the system of this disclosure.

As indicated above, the tracking system includes a motion recognition algorithm, which may be present in CPU 28 of device 14 or may be stored remotely, for example, by computer 18 or by a separate device. The motion recognition algorithm includes appropriate programming or code to complete the following steps: data acquisition, segmentation, similarity search, similarity comparison, map identification and classification, and finally, send command, as shown in FIG. 4. In the first step 101, raw data from each sensor axis are acquired, be it from a 3-DOF motion sensor, 6-DOF motion sensor, etc., and collected. Preferably, motion sensor 40 (e.g., motion sensor 40A, 40B, etc.) is calibrated so that the sensor(s) correctly track the pallet movement. Typically, the calibration will be performed in the field every time when the pallet and/or tracking device goes into its maintenance stage. The procedure in which the sensor is calibrated is consistent and traceable.

After data is collected in step 101, the data are segmented (step 102) to reduce the number of search points; a sliding window and bottom-up (SWAB) algorithm can be used. The SWAB moves a segment buffer along the data, linearly returning segments and continuously adding new data. The segmentation is obtained by testing the approximation of the data signal by linear regression lines.

In a subsequent similarity search step 103, the segmentation points are used to search for potential motions using a feature similarity detection algorithm. The search is performed by comparing features of a data section under investigation to a trained pattern. For a given segmentation point, the history of sensor data is analyzed from a lower up to an upper search bound. These bounds are determined in the training step from minimum/maximum overlaps of the annotated events and the segmentation points.

In the similarity comparison step 104, at least some of; and preferably all, independent motion detection results of the feature similarity searches (from step 103) are merged to form a motion section. For example, a sliding buffer of motion sections algorithm can be used. Any overlapping of entering motion sections with sections already in the buffer is resolved in favor for the highest confidence section. Sections are released from the buffer after a timeout.

In the map identification and classification step 105, the motion section is assigned to a category. Although perfect classification performance is desired, it can be difficult; thus, it is acceptable to utilize a more general task to determine the probability for each of the possible categories. Examples of tasks or categories include an unloading event, a loading event, a transportation event or a pallet repair event. Each category will be associated with a command, which is step 106.

Figure 5:
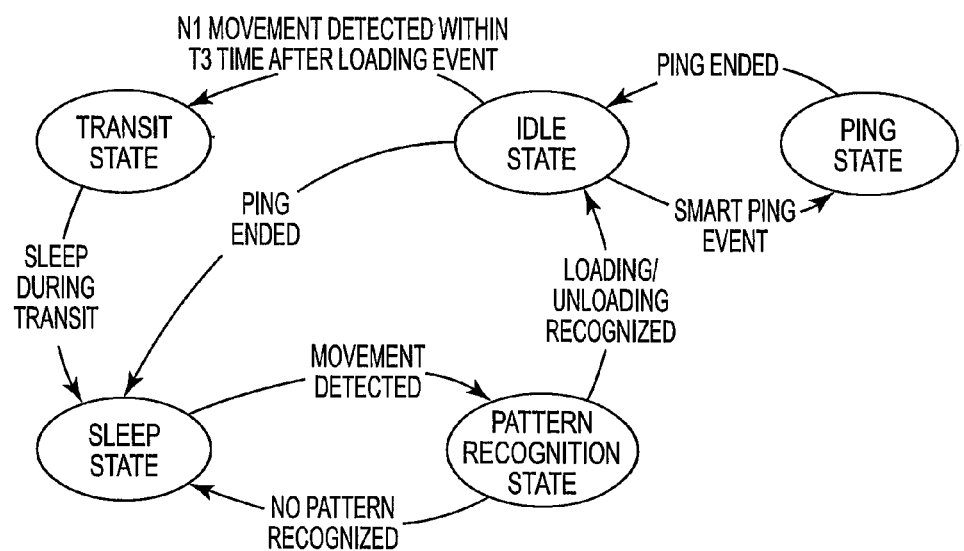
FIG. 5 is an alternate schematic block diagram showing a sequence of actions by the system of this disclosure to send a data ping.

FIG. 5 shows an example of state diagram for the transmitter device for loading and unloading events. Initially, the transmitter device is in a "sleep state", conserving battery power. The device will go to a "pattern recognition state" when movement is detected by the internal motion sensor; the device will continue to monitor the motion. When the sequence of motions does not match the pattern for a predetermined motion, the transmitter device returns to the sleep state, and stays in this state until another movement is detected. If the sequence of motions is recognized as a loading or unloading event, or another predetermined event, the device goes to an "idle state". If a predetermined time period T2 (not shown in FIG. 5) has expired, the device will go to a "ping state" in which the device will send a data ping to a remote host, after which it returns to the idle state again. If a wireless communication mechanism or network (e.g., CDMA, GSM, ZigBee, LBT) is unavailable, the message (i.e., the data) will be saved in an internal memory of the device for later transmittal. Hereafter, the device will switch to a "sleep state". If the motion sensor of the device detects a sequence of movements (the number of movements being at least N1) within a time period T3 (where T2<t<T3), the device will go into a "transit state", which correlates to the asset being physically in transit, usually for an extended duration of time. After the device is in the "transit state", it immediately returns to "sleep state" without enabling the motion sensor, in order to preserve the battery. While in the "sleep state", the device will occasionally wake up (usually every 1-30 hours, although could be longer depending on the transportation distance) and enable the motion sensor to check if the transit is finished by determining if the movement is ongoing. The device goes to the sleep state when no activity is observed.

Figure 6:
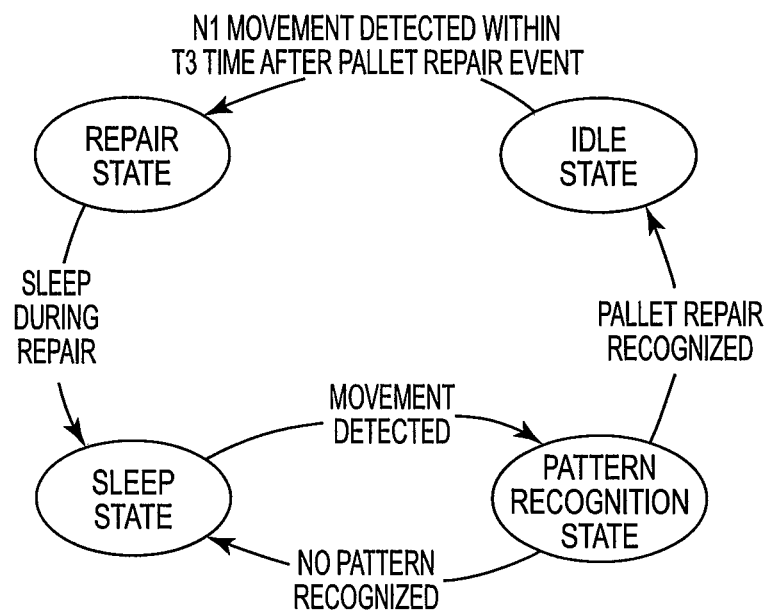
FIG. 6 is a schematic block diagram showing a sequence of actions by the system of this disclosure during a repair or down state of the tagged asset.

FIG. 6 shows an example of state diagram for the transmitter device for a pallet repair event. Again, initially the device is in "sleep state". The device will go to a "pattern recognition state" when movement is detected. When a sequence of movement is detected but does not match a predetermined pattern of motion, the transmitter device returns to sleep state, and remains in this state until another movement is detected. If a sequence of movements identifying a pallet repair event is recognized, the device goes to "idle state". From this idle state, if the sensor observes a sequence of movements (with the number of movements equal to or more than N1) within a time period T3, the device will go into a "repair state". After the device is in the repair state, it goes immediately into sleep mode without enabling the motion sensor in order to preserve the battery. While in the "sleep state", the device will occasionally wake up (usually every 1-30 hours, although could be longer depending on the repair process) and enable the motion sensor to check if the repair is finished. The device remains in the sleep state when no activity is observed.

Figure 7:
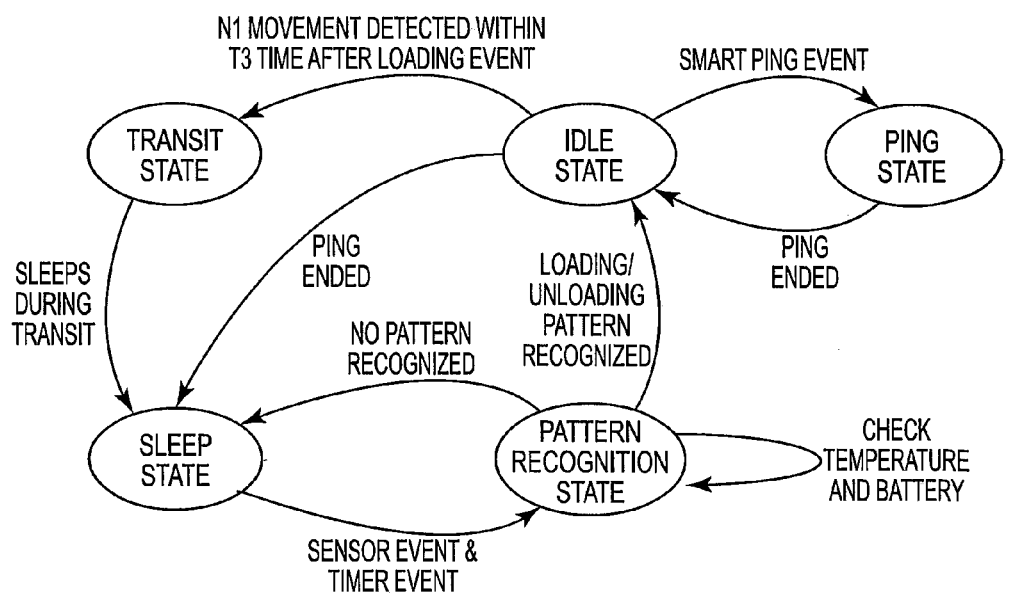
FIG. 7 is an alternate schematic block diagram showing another embodiment of a sequence of actions by the system of this disclosure to send a data ping.

FIG. 7 shows another example of a state diagram of the transmitter device of the tracking system, similar to the state diagram of FIG. 5, except that the tracking system of this embodiment is both motion-based and time-based. Turning to FIG. 7, initially the transmitter device is in "sleep state". The device switches to a "pattern recognition state" when a first time period T1 (not shown in FIG. 7) is expired or movement is detected by the motion sensor. If the device is woken up by motion detection, the device will check if the sequence of motion is recognized as a predetermined pattern. If the sequence of motion is not recognized, the device will return to its sleep state. If the sequence of motion is associated with a business event, such as loading or unloading, the device will go to an "idle state". From the idle state, the device goes to a "ping state" where the device will send a ping to a remote host, after which it returns to the idle state. If a wireless communication mechanism or network (e.g., CDMA, GSM, ZigBee, LBT) is unavailable, the ping message will be saved in an internal memory of the device for later transmission. After the ping transmission has ended, the device switches to its sleep state. If, when in the idle state, the motion sensor of the device detects a sequence of movements (with the number of movements being at least N1) within a third time period T3, the device will go into a "transit state", which generally correlates to the asset being physically in transit. Once the device is in the transit state, it goes immediately into a power-saving sleep mode without enabling the motion sensors in order to preserve the battery.

Exemplary and non-limiting time periods and numbers for the above-described three scenarios are:
T1: 12 hours-4 days, for example, 24 hours or 1 day, or 48 hours or 2 days
T2: 20-60 seconds, for example, 30 seconds
T3: 30-120 seconds, for example, 60 seconds
N1: 2-5 movements, for example, 3 movements In some embodiments, such as those described in relation to FIGS. 5 and 6, the event that changes the device from its initial sleep state to idle state is identified by a sequence of movements. Those sequences of motion may follow a certain pattern of movement, and generally this pattern is fixed or within a boundary condition. Those sequences are unique for every business event, such as unloading, loading or other movement event. Typical loading and unloading movement sequences have been identified above. By associating a ping with these business events, the pinging is made more relevant and effective. In general, this pattern of movements occurs only at predetermined locations at approximately predetermined times. Therefore by recognizing this pattern of movements, one can not only predict a business event but also a gross location of the asset.

In such a manner, the tracking systems of this disclosure produce an active ping based on the occurrence of a predetermined event. By intelligently selecting the occurrence of the pings, the system has an increased value per ping, focusing the pings around events of importance to the asset, and extending battery life. Each ping is more relevant and effective for the systems of this disclosure than for systems that randomly and/or continuously ping.

Figure 8:
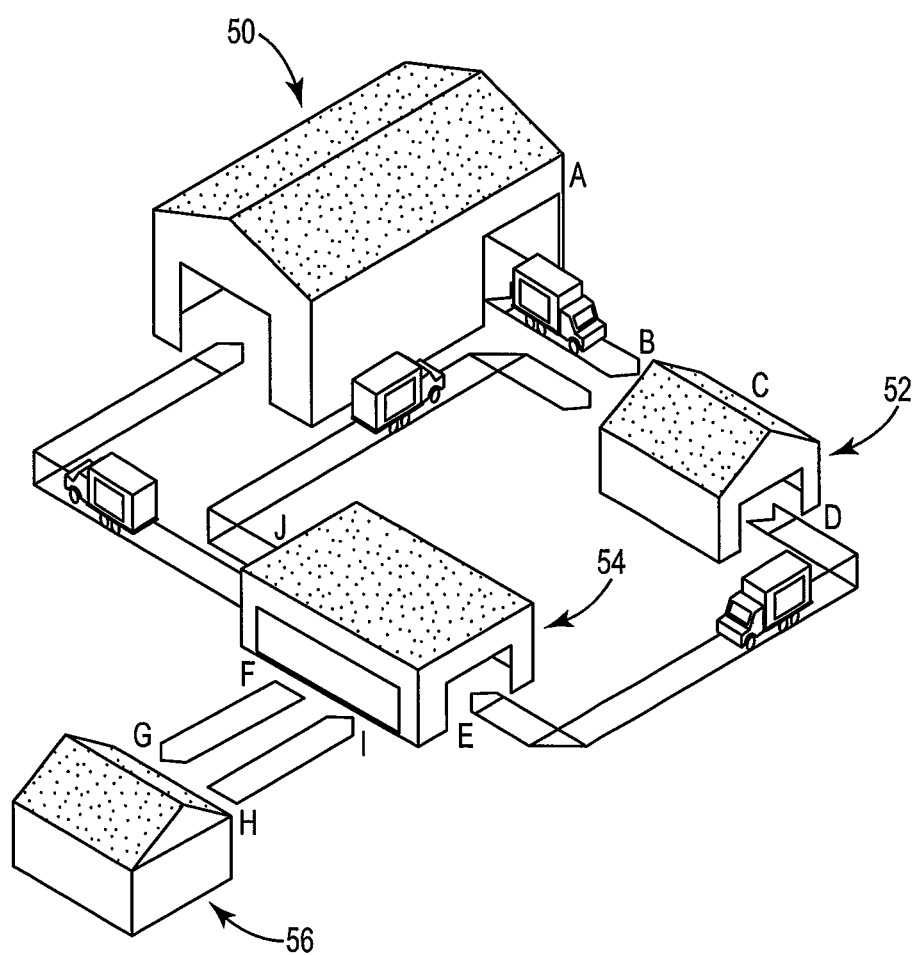
FIG. 8 is a schematic rendering of an exemplary route taken by a tagged asset.

FIG. 8 illustrates an example of a route of an asset being tracked; the route includes several loading or unloading activities, which are business events. In this embodiment, pallet 13 of asset 12 has the transmitter device thereon, thus, it is the movement of the pallet that is being tracked. The transmitter device will send a data ping at each of the business events.

In FIG. 8, the pallet tagged with the transmitter device begins in a warehouse or pallet service center 50; the transmitter device is typically in an inactive, sleep state. Typically, at this stage, the pallet is bare or empty, not having any goods loaded thereon. When the pallet is loaded onto a truck or other vehicle, the motion sensor determines that a predetermined sequence of movements has occurred, which thus represents a business event A. Thus, the transmitter device initiates the process to send a 'ping' to the receiver.

From center 50, the pallet is moved to a manufacturing facility 52, where it is unloaded at a loading dock; the unloading of the tagged pallet from the truck is business event B, at which time the transmitter device initiates the process to send a 'ping' to the receiver.

Returning to FIG. 8, at manufacturing facility 52, goods are placed onto the tagged pallet; this act of packing and moving the pallet may or may not be identified as a business event C, depending on the desire of the trackee. If the action is a business event, identified by a predetermined sequence of motion, the transmitter device initiates the process to send its data ping. Business event D identifies when the loaded pallet is loaded onto a truck or other vehicle, and a ping is sent. Throughout the continued route, if an activity such as loading or unloading is defined as a business event, the transmitter device initiates the process to send its data ping.

During transport of the tagged pallet from manufacturing facility 52 to a distribution center 54, the device detects continuous movement and recognizes that the pallet is in a prolonged transport, thus inactivating the motion sensor. Upon reaching distribution center 54, the pallet is unloaded at a loading dock by a pattern of movements that is recognized as business event E. At distribution center 54, the pallet may be loaded (business event F) and sent to a retail outlet 56 and unloaded there (business event G). Returning the pallet to distribution center 54 from retail outlet 56 provides business event H when the pallet is loaded onto the vehicle and business event I when the pallet is unloaded.

In some embodiments, if the pallet is unloaded at distribution center 54 (business event E), an empty pallet may be transferred back to center 50 or to manufacturing facility 52; placing the empty pallet onto the vehicle for transport is business event J.

As described above, until a business event is detected, the transmitter device of the system is idle. When the business event (e.g., movement) is confirmed, the transmitter device initiates the process to send its data ping. Although various business events have been identified in the above scenario, it is understood that other actions within the scenario could be identified as business events, or that some actions identified above may be removed as business events. For example, movement of the pallet within a facility (e.g., within distribution center 54, 64) may be a business event.

Although the above discussion has described that "a ping" or "data ping" is sent, it should be understood that in many of these situations, multiple sequential pings may be sent. For example, 5 pings one minute apart may be sent; such an example has a ping rate of 1 ping/minute and a ping period of 4 minutes. As another example, 4 pings two minutes apart may be sent; such an example has a ping rate of 0.5 ping/minute and a ping period of 6 minutes.

As will be appreciated by one of skill in the art, the invention of the present disclosure may be embodied as a method, system, computer program product, or a combination thereof. Accordingly, the invention of the present disclosure may take the form of an entirely hardware embodiment, an entirely software embodiment (including firmware, resident software, micro-code, etc.) or an embodiment combining software and hardware aspects that may generally be referred to herein as a "system." Furthermore, the invention of the present disclosure may take the form of a computer program product on a computer-usable storage medium having computer-usable program code embodied in the medium.

Any suitable computer usable or computer readable medium may be utilized with computer 18 (FIG. 1). In the context of this disclosure, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the invention of the present disclosure may be written in an object oriented, scripted or unscripted programming language such as Java, Perl, Smalltalk, C++ or the like, or may be written in conventional procedural programming languages, such as the "C" programming language or similar programming languages.

The invention of the present disclosure is described below with reference to flowchart illustrations and/or block diagrams of the methods, apparatus (systems) and computer program products according to embodiments of the disclosure. It will be understood that each block of the flowchart and/or block diagram, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

In such a manner, the tracking systems of this disclosure produce an active ping based on a predetermined event. By intelligently selecting the occurrence of the pings, the system has an increased value per ping, focusing the pings around events of importance to the asset, and extending battery life. By associating the ping rate with a predetermined business event, each ping is more relevant and effective than for systems which randomly and/or continuously send ping data to the receiver.

Thus, embodiments of the ASSET TRACKING SYSTEM ACTIVATED BY PREDETERMINED PATTERN OF ASSET MOVEMENT are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of tracking an asset with a wireless RF system comprising a transmitter and a receiver, the method comprising:
 (a) beginning with the transmitter in a sleep state;
 (b) monitoring for movement with the transmitter in the sleep state;
  (i) if movement is detected, the transmitter switching to a pattern recognition state;
   (A) if no pattern of movements is recognized, the transmitter returning to the sleep state;
   (B) if a pattern of movements is recognized, the transmitter switching to an idle state;
  (ii) if a sequence of at least N1 movements, where N1 is 2 or more, is detected within a third time period T3, switching to a transit state and then to a second sleep state;
 (c) monitoring for movement from the second sleep state and checking a timer;
  (i) if movement is detected the device will remain in the sleep state;

(ii) if no movement is detected within a fourth time period T4, the transmitter switching to the ping state, sending data regarding the location of the transmitter, and then switching to the idle state;

(d) the transmitter switching to a ping state from the idle state if a time period T2 has expired, and sending a data ping from the transmitter to the receiver; and (e) after sending the data ping, the transmitter returning to the idle state.

2. The method of claim 1 wherein switching to a transit state and then to a second sleep state occurs if a sequence of at least 3 movements is detected.

3. The method of claim 1 wherein the time period T2 is between 20 and 60 seconds.

4. The method of claim 1 wherein the time period T3 is between 30 and 120 seconds.

5. The method of claim 1 wherein the time period T4 is between 5 and 30 minutes.

6. An RF tracking system comprising:
a transmitter comprising a power source, a Global Positioning System (GPS) positioning element, a motion sensor, a two-way wireless radio frequency (RF) communication module, a timer and control circuitry; and
a receiver; the transmitter configured to send data regarding the location of the transmitter to the receiver, and the receiver configured to receive the data from the transmitter;
the transmitter having a first sleep state, an idle state, a pattern recognition state, a ping state, and a transit state, wherein:
from the sleep state, the transmitter will switch to the pattern recognition state if movement of the transmitter is detected by the motion sensor;
if no pattern of movements is recognized, the transmitter will return to the sleep state, but if a pattern of movements is recognized, the transmitter will switch to the idle state;
if a time period T2 has expired, the transmitter will switch to a ping state from the idle state and send a data ping from the transmitter to the receiver, after which it will return to the idle state; and
if a sequence of at least N1 movements, where N1 is 2 or more, is detected within a third time period T3, the transmitter will switch to the transit state and then to the sleep state; when in the sleep state, if movement is detected, the device will remain in the sleep state, but if no movement is detected within a time period T4, the transmitter will switch to the ping state, send data regarding the location of the transmitter, and then switch to the idle state.

7. The system of claim 6 wherein:
T2 is between 20 and 60 seconds;
T3 is between 30 and 120 seconds; and
T4 is between 5 and 30 minutes.

8. The system of claim 6 wherein the motion sensor comprises at least 3 degrees of freedom.

9. The system of claim 8 wherein the motion sensor comprises at least 6 degrees of freedom.

10. The system of claim 9 wherein the motion sensor comprises at least 9 degrees of freedom.

11. The system of claim 6 wherein the communication module is a ZigBee, ZigBee/LBT, or Low Energy BlueTooth communication module.

12. The system of claim 6 wherein the communication module is a CDMA and/or GSM communication module.

13. An RF tracking system comprising:
a transmitter comprising a power source, a Global Positioning System (GPS) positioning element, a motion sensor, a two-way wireless radio frequency (RF) communication module, a timer and control circuitry; and
a receiver; the transmitter configured to send data regarding the location of the transmitter to the receiver, and the receiver configured to receive the data from the transmitter;
the transmitter having a first sleep state, an idle state, a pattern recognition state, a ping state, and a transit state, wherein:
from the sleep state, the transmitter will switch to the pattern recognition state if movement of the transmitter is detected by the motion sensor;
if no pattern of movements is recognized, the transmitter will return to the sleep state, but if a pattern of movements is recognized, the transmitter will switch to the idle state;
if a time period T2 has expired, the transmitter will switch to a ping state from the idle state and send a data ping from the transmitter to the receiver, after which it will return to the idle state;
if a sequence of at least N1 movements is detected within a third time period T3, the transmitter will switch to the transit state and then to the sleep state; and
when in the sleep state, if movement is detected, device will remain in the sleep state, but if no movement is detected within a time period T4, the transmitter will switch to the ping state, send data regarding the location of the transmitter, and then switch to the idle state.

14. The system of claim 13 wherein the motion sensor comprises at least 9 degrees of freedom.

15. The system of claim 13 wherein the communication module is a ZigBee, ZigBee/LBT, or Low Energy BlueTooth communication module.

16. The system of claim 13 wherein the communication module is a CDMA and/or GSM communication module.

* * * * *